United States Patent [19]
Lynch

[11] Patent Number: 5,410,844
[45] Date of Patent: * May 2, 1995

[54] BUILDING VENT ASSEMBLY

[76] Inventor: Gary M. Lynch, "Tallarook", Mt Cotton Rd., Mt. Cotton, Queensland 4163, Australia

[*] Notice: The portion of the term of this patent subsequent to Apr. 10, 2007 has been disclaimed.

[21] Appl. No.: 931,979

[22] Filed: Aug. 19, 1992

Related U.S. Application Data

[63] Continuation-in-part of Ser. No. 394,660, Aug. 16, 1989, Pat. No. 5,140,788.

[30] Foreign Application Priority Data

Aug. 16, 1988 [AU] Australia ................ PI9880

[51] Int. Cl.⁶ .............................................. A01G 15/00
[52] U.S. Cl. ................................... 52/63; 47/1.7; 454/358
[58] Field of Search ............ 52/63 OR, 66, 72, 69; 47/17 FM; 454/358

[56] References Cited

U.S. PATENT DOCUMENTS

| | | |
|---|---|---|
| 4,387,533 | 6/1983 | Green et al. ............... 47/17 FM |
| 4,494,707 | 1/1985 | Niibori et al. .............. 47/17 FM |
| 4,565,230 | 1/1986 | Van Rijn et al. ........... 47/17 FM |
| 4,624,084 | 11/1986 | Esposito ..................... 47/17 FM |
| 4,672,889 | 6/1987 | Lynch . |
| 4,915,022 | 4/1990 | Lynch . |
| 5,197,238 | 3/1993 | Peleg ........................... 52/63 |

FOREIGN PATENT DOCUMENTS 524126  1/1993  European Pat. Off. ........ 47/17 FM

*Primary Examiner*—Carl D. Friedman
*Assistant Examiner*—Wynn E. Wood
*Attorney, Agent, or Firm*—Hoffman, Wasson & Gitler

[57] ABSTRACT

A vent assembly for a igloo-type building of the type having a number of arcuate roof frame members extending between side gutters, the vent assembly including a Z-sectioned member secured to the roof frame members and extending parallel to the side gutters, the region between the Z-sectioned member and adjacent gutter defining a vent opening into the building. A roller blind has its fabric secured to the Z-sectioned member and may be unrolled to close the vent opening or rolled up to open the vent opening.

17 Claims, 2 Drawing Sheets

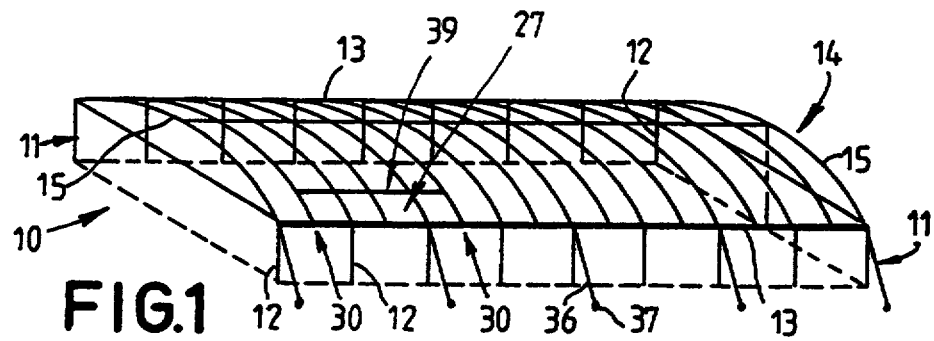
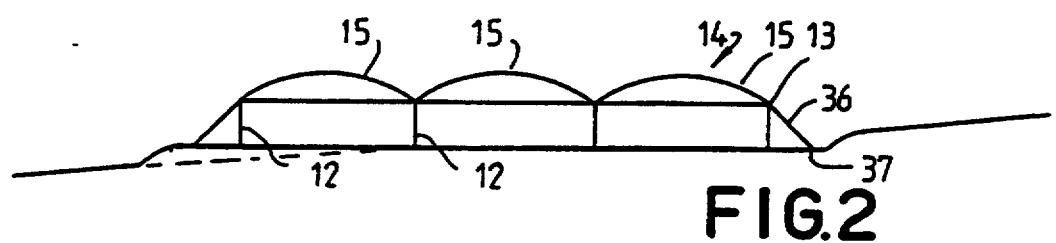
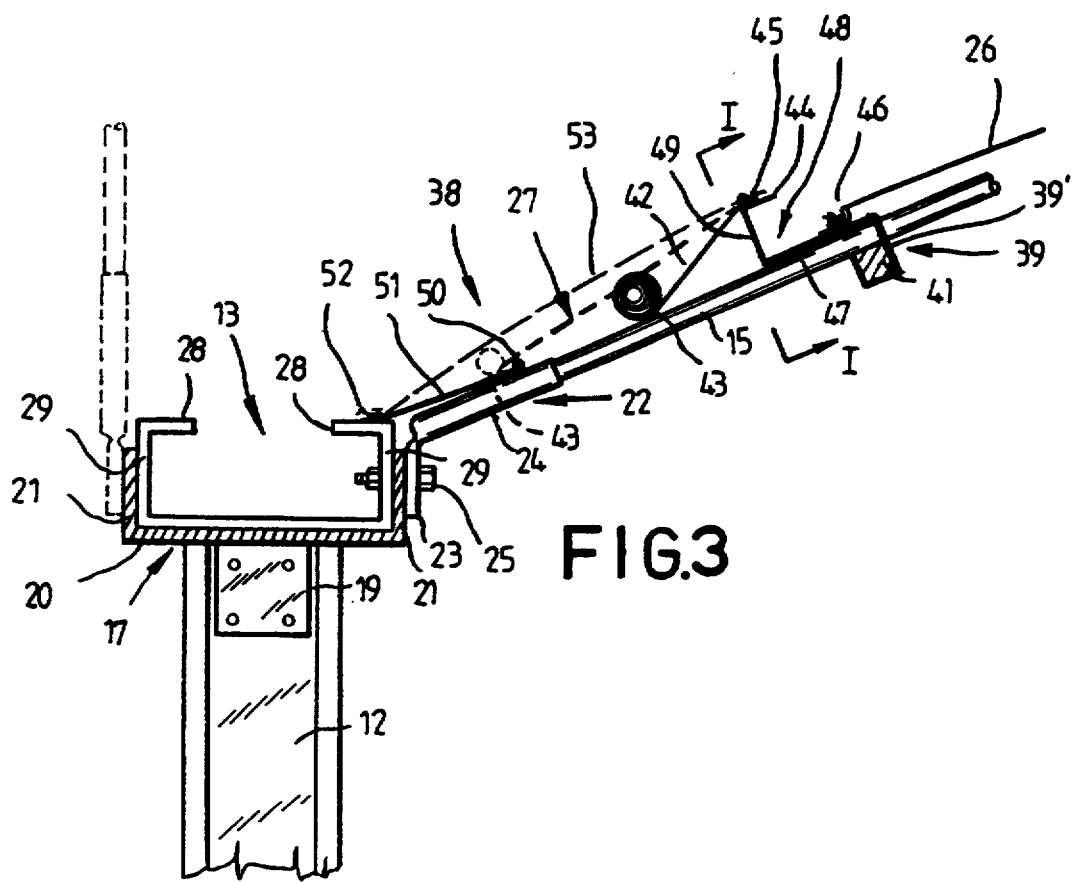

BUILDING VENT ASSEMBLY

CROSS REFERENCE TO RELATED APPLICATION

This application is a continuation-in-part of application Ser. No. 394,660 filed Aug. 16, 1989, which matured into U.S. Pat. No. 5,140,788 on Aug. 25, 1992.

FIELD OF THE INVENTION

This invention relates to a building vent assembly and in particular to a vent assembly for use in plant nursery buildings, greenhouses or other like structures.

DESCRIPTION OF THE RELATED ART

Many different forms of building constructions are available for plant nursery or other applications. In one known form of building, the sides of the building are defined by a plurality of aligned upright side members which carry at their upper ends longitudinally extending gutter sections between which a roof assembly may be supported.

Various different roof assemblies have been proposed for buildings of the above type and for other plant nursery buildings and generally it is important in such buildings that an efficient means is provided to enable venting of hot air. Such proposals in the past have involved the provision of vent systems at the roof apex such as that of the type disclosed in my U.S. Pat. Nos. 4,672,889 and 4,915,022, and whilst such systems are suitable in many circumstances, they increase the overall cost of buildings.

BRIEF SUMMARY OF THE INVENTION

The present invention aims to overcome or alleviate one or more of the above disadvantages or at least to provide an alternative to the presently known vent systems for buildings such as igloo type agricultural buildings.

The present invention thus provides a vent assembly for a building of the type having a roof frame assembly terminating at one side of said building at a side frame member extending longitudinally of the building, the vent assembly including a further frame member supported on the roof frame assembly at a position spaced from and extending substantially parallel to said side frame member. A vent opening into said building is formed in the region between the side and further frame member, and vent closing means are secured to the further frame member and are movable to open and close the vent opening. The vent closing means comprises a roller blind or screen secured at, one end to the further member, the roller blind being adapted to be unrolled to close the vent opening or rolled up to open the vent opening.

The further frame member preferably defines a gutter and the main roof covering is supported on the roof frame assembly and terminates at the gutter. The further frame member is preferably of Z-sectioned form with its middle flange lying on and supported by the roof frame assembly. One side of the said Z-sectioned frame member is slotted so as to cooperate with said roof frame assembly.

The side frame member comprises a side gutter member for the building and the roof frame assembly includes a plurality of roof frame members supported to the side gutter member. The side gutter member includes a pair of opposite upstanding side walls and a pair of top flanges extending inwardly from the opposite side walls.

A region of the roof frame assembly adjacent the side frame member is covered by a covering providing a seal adjacent the side frame member, the roller blind in its closed position overlying the covering. Preferably, a cable is supported on the roof frame assembly and extends substantially parallel to the side frame member or gutter, the covering extending between the cable and the side frame member or gutter. A mesh material may extend between the side frame member or gutter and further frame member and over the roller blind.

BRIEF DESCRIPTION OF THE DRAWINGS

In order that the invention may be more readily understood and put into practical effect reference will now be made to the accompanying drawings which illustrate a preferred embodiment of the invention and wherein:

FIGS. 1 and 2 illustrate in schematic perspective and end views the frame of a t, typical building incorporating a vent assembly in accordance with the present invention;

FIG. 3 is a sectional view illustrating details of the vent assembly adjacent one side of the building;

DETAILED DESCRIPTION OF THE DRAWINGS

Figure 4:
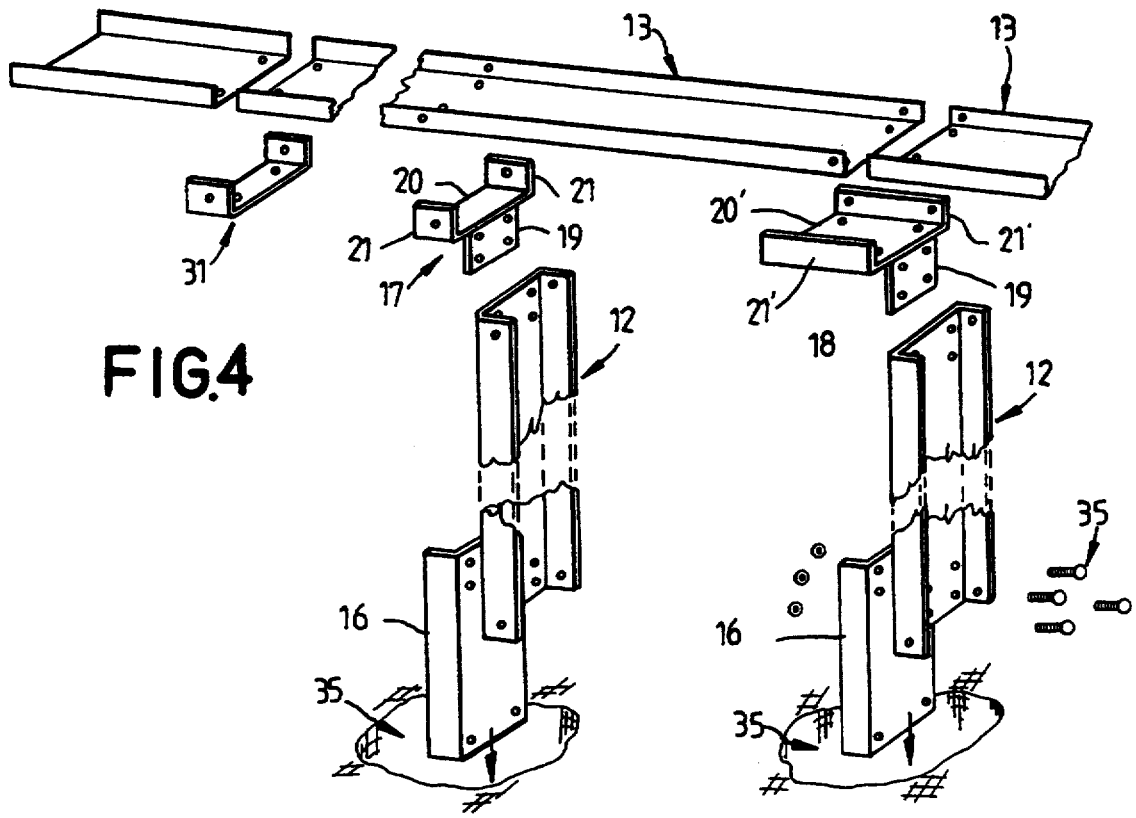
FIG. 4 illustrates in exploded view portion of a side wall construction of a building according to the invention.

Referring to the drawings and firstly to FIGS. 1 and 2 there is illustrated a building 10 including a pair of side frame assemblies 11 defined by first and second rows of a plurality of upstanding members 12 which support at their upper end elongated side gutter members 13 of channel sectioned form. A roof frame assembly 14 comprised of a plurality of arcuate members 15 extends between the side frame members 13 to be supported thereby or by the upstanding members 12.

As shown more clearly in FIGS. 3 and 4 the side frame members 12 are of channel sectioned form and are supported and secured as by bolting at their lower end in back to back relationship to further foundation channel members 16 whilst at their upper ends, the members 12 carry brackets 17 or 18 which define seats for the elongated gutter members 13. Each bracket 17 or 18 as shown includes a depending flange 19 which extends into the channel of the member 12 and is secured thereto by means of bolts passed through aligned apertures in the depending flange 19 and side members 12. The brackets 17 and 18 also include base flanges 20 extending substantially at right angles to the depending flanges 19, the base flanges 20 being apertured so as to facilitate connection by bolting to the gutters 13.

The base flanges 20 are provided with a pair of upstanding side flanges 21 which are spaced apart slightly more than the distance between the side flanges of the gutter members 13 so that the gutter members 13 locate neatly therebetween and so the side flanges 21 provide a support for the gutter sections 13 during high wind loading on the roof. It will be seen that in the bracket 18, enlarged base flanges 20' and side flanges 21' are provided so as to define a mount for a pair of abutting gutter members 13 (see FIG. 4 ).

For supporting the roof frame members 15, a plurality of further brackets 22 are provided, each bracket 22 being in the form of a short section of pipe flattened and apertured at one end 23 and defining a socket at its other end 24 for neat receipt of the end of an arcuate roof member 15 (see FIG. 3). The flattened end 23 is disposed at an obtuse angle to the end 24, however, this angle may be varied by simple bending of the end 23 relative to the end 24 to compensate for variations in the ground surface upon which the building is erected.

As shown in FIG. 3, the flattened end 23 of the bracket 22 is secured to a side flange 21 (or 21') of the bracket 17 (or 18) by means of a bolt or other fastener 25 passed through the aligned apertures in the flattened portion 23 and flange 21 and also through the side walls 29 of the gutter member 13.

At positions 30 intermediate the upstanding members 12, brackets 31 of channel sectioned form may be employed being secured to the underside of the gutters 13 and having the roof frame members 15 connected thereto via the brackets 22 in a similar manner to that shown in FIG. 3.

The roof covering 26 of the building 10 preferably is in the form of a fabric which may be a woven fabric, for example a shade cloth or an impervious material such as a plastic film and is disposed above and supported by the roof frame members 15. Incorporated into the roof adjacent the gutter 13 is a vent opening 27 which is controlled in the manner described below.

In erecting the side walls 11 of the building according to the invention and as shown in FIG. 4 a plurality of foundation holes 35 are formed at spaced apart positions where the wall is to be erected and supported, and the elongated gutter members 13 are then laid out along the line of the foundation holes 35 and interconnected where required by the brackets 18, the position of which corresponds to location of some of the foundation holes 35. Brackets 17 may then be secured to the interconnected gutter members 13 in alignment with further foundation holes 35 and the channel brackets 31 may be secured to the gutters 13 at positions intermediate the brackets 17 or 18. Respective foundation channel members 16 may then be secured to the respective brackets 17 or 18 so as to be upstanding therefrom. The whole assembly may then be overturned so that the foundation members 16 locate in the foundation holes 35 and the holes 35 may then be filled with concrete with the gutters 13 and brackets 17 and 18 acting as locating jigs whilst the concrete is being applied and whilst the concrete is curing. If required conventional means may be employed to ensure leveling of the foundation members 16. After curing the channel members 16 may be detached from the brackets 17 and 18 and the walls may be erected.

For wall erection respective side members 12 are located in back-to-back relationship to the upstanding channel members 16 supported in their foundation holes and are secured at one end by the brackets 17 and 18 to the assembled gutter members 13 and at their opposite end by a single bolt to the respective foundation members 16, this bolt serving as a pivot bolt. The assembly of gutters 13 and side members 12 may then be erected by pivoting same about the pivot bolts with the aid of bracing cables if desired until the side members 12 adopt an upright attitude so that they may be secured to the channel members 16 in the manner described with reference to FIG. 4. The side walls 11 of the building may be further braced against longitudinal movement as desired.

As shown in FIGS. 1 and 2 the side support members 12 may be braced by cables 36 anchored at 37 in the ground and having sleeve placed therearound so as to define a support for shade cloth or other material at the side of the building. At the end walls, the bracing is preferably by means of channel sectioned members which extend at an inclined angle to be anchored in the ground.

Figure 5:
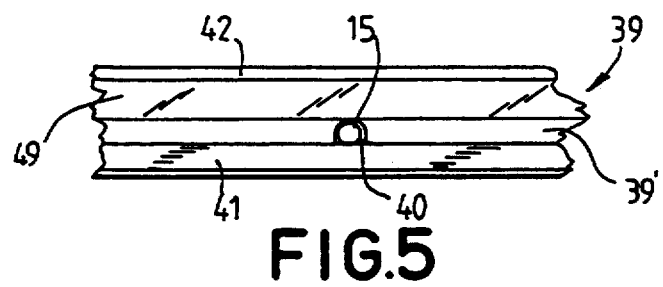
FIG. 5 is a sectional view along the line A—A of FIG. 3.

The roof frame assembly 14 described above supports a vent assembly 38 adjacent the vent opening 27 which is shown applied to a gutter-roof frame structure of the type shown in FIG. 3, however, it may readily be applied to other building configurations. As shown, the vent assembly includes a Z-sectioned frame member 39 extending longitudinally of the building, parallel to the gutters 13 but spaced therefrom. One end flange 39' side of the Z-sectioned member 39 is cut-out at spaced positions 40 (see FIG. 5) so as to locate about respective arcuate roof frame members 15. Preferably a beading member 41 extends along the Z-sectioned member 39 to brace flange 39' in the regions of the cut-out portions 40, the beading member 41 being secured to the Z-sectioned member 39 in any suitable manner, for example by welding. The region between the gutter member 13 and frame member 39 comprises the vent opening 27. Fabric 42 of a roller blind 43 is secured to the top flange 44 of the Z-section member 39 by any suitable fastener or clamp 45 and it will be apparent that the roller blind 43 being supported on and extending transversely of the roof frame members 15 may be rolled up or down to open or close the vent opening 27 between the member 39 and gutter 13. The main roof fabric 26 in this embodiment terminates at, and is secured to the member 39 by an elongated fastener system 46 at the mid flange 47. The member 39 thus acts as a gutter to collect, in the region 48 between the junction of the mid flange 47 and end flange 49, water run off from the roof fabric 26.

A cable 50 is also located in the vent region extending longitudinally of the building and generally parallel to the gutter 13 and member 39. The cable 50 may be either supported on the brackets 22 or roof members 15 and may be tensioned between end roof frame members. A plastic film 51 is secured to the cable 50 and extends between the cable 50 and top flange 28 of the gutter 13 and is secured thereto by a longitudinally extending clamp 52. The film 51 serves as a bottom seal for the vent assembly 38 adjacent the gutter 13.

A shade cloth or other pervious material 53 may also be provided to extend between the gutter 13 where it is secured by the clamp 52 and member 39 where it is secured by the clamp 45 and over the film 51 and roller blind 43.

When the roller blind 43 is rolled up, such as to the position of FIG. 3, hot air will be permitted to exit from the building through the vent opening 27 whilst cool air will be allowed to enter being assisted by laminar air flow over the building. When the roller blind 43 is closed, (as shown in dotted outline) it will be positioned over the film 51 so that the roof 15 will be weatherproof with water gathering in the fabric 42 of the blind 43 being directed onto the film 51 and into the gutter 13.

The vent assembly 38 described above may be incorporated into a part of the building frame and may either extend the full length of the building or only be provided in a small section of the building.

The above frame system is designed to follow the contour of the land upon which the building is erected so as to minimize excavation costs, this being accommodated by the use of the brackets 22 which may be bent to the required angle in accordance with the contour. All the side members 12 in this situation are supported vertically and the gutters follow the fall of the land. It is preferred that the building be reasonably level across its width with a fall down the length of the building for good drainage purposes. The building described above may have many configurations as desired for a suitable purpose such as for greenhouses or shade houses.

I claim:

1. A building of the type having a roof comprising a roof frame assembly terminating at one side of said building at a side frame member extending longitudinally of said building, said roof supporting:
   a vent assembly adjacent said side frame member, said vent assembly including:
      a further frame member supported on said roof frame assembly at a position spaced from and extending substantially parallel to said side frame member;
      a vent opening into said building between said side and further frame member; and
      vent closing means secured to said further frame member and movable to open and close said vent opening.

2. A building according to claim 1 wherein: said vent closing means comprises a roller blind or screen secured at one end to said further member and being adapted to be unrolled to close said vent opening or rolled up to open said vent opening.

3. A building according to claim 1 wherein said further frame member defines a gutter and wherein roof covering is supported on said roof frame assembly and terminates at said gutter.

4. A building according to claim 1 wherein:
   said further frame member has a Z-sectioned profile including a middle flange and oppositely extending end flanges and wherein the middle flange lies on and is supported by said roof frame assembly.

5. A building according to claim 4 wherein:
   one end flange of said Z-sectioned frame member is slotted so as to cooperate with said roof frame assembly.

6. A building according to claim 1 wherein said side frame member includes a side gutter member for said building and wherein said roof frame assembly includes a plurality of roof frame members supported to said side gutter member.

7. A building according to claim 6 and wherein said side gutter member includes a pair of opposite upstanding side walls and a pair of top flanges extending inwardly from the opposite side walls.

8. A building according to claim 2 wherein:
   said roof frame assembly adjacent said side frame member is covered by a covering film extending from said side frame member towards said further member, said roller blind in its closed position overlying said covering film.

9. A building according to claim 8 and including a cable supported on said roof frame assembly and extending substantially parallel to said side frame member, said covering film extending between said cable and said side frame member.

10. A building according to claim 2 and including a mesh material extending between said side frame member and further frame member and over said roller blind.

11. A building of the type having a roof including a roof frame assembly comprising a plurality of transversely extending roof frame members terminating at one side of said building at a side gutter extending longitudinally of said building, said roof having:
    a vent assembly adjacent said side gutter, said vent assembly including:
       a frame member supported on said roof frame members at a position spaced from and extending substantially parallel to said side gutter;
       a vent opening through said roof between said side gutter and said frame member; and
       roller blind means fixed to said frame member and supported by said roof frame members and movable therealong towards and away from said gutter to close and open said vent opening.

12. A building according to claim 11 wherein said frame member comprises a further gutter and wherein roof covering film for said building terminates at said further gutter.

13. A building according to claim 12 wherein said further gutter comprises a Z-sectioned member slotted at spaced apart positions on one side for location over respective roof frame members.

14. A building according to claim 12 and including:
    a covering film secured to said side gutter and supported on the adjacent roof frame members and extending towards said frame member, said roller blind means in its vent closing position overlying said covering film.

15. A building of the type having a roof including a roof frame assembly comprising a plurality of arcuate roof frame members extending between opposite sides of said building, said roof having:
    a vent assembly adjacent one side of said building, said vent assembly including:
       a frame member supported on said roof frame members at a position spaced from and extending substantially parallel to said one side of said building;
       a vent opening through said roof between said frame member and said one side of said building; and
       vent closure means for opening and closing said vent opening.

16. A building according to claim 15 wherein said vent closure means comprises roller blind or screen means.

17. A building according to claim 15 wherein said frame member comprises an elongated gutter member.

* * * * *